US012697850B2

(12) United States Patent
Claussen et al.

(10) Patent No.: US 12,697,850 B2
(45) Date of Patent: Aug. 4, 2026

(54) TWIST BEAM AXLE

(71) Applicant: BENTELER AUTOMOBILTECHNIK GMBH, Paderborn (DE)

(72) Inventors: Lars Claussen, Bad Lippspringe (DE); Olaf Hertel, Braunschweig (DE); Andreas Rieckmann, Braunschweig (DE); Eduard Schmidt-Beljawski, Uelzen (DE); Klaus Schneider, Marsberg (DE); Erik Schultz, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 18/912,597

(22) Filed: Oct. 11, 2024

(65) Prior Publication Data

US 2025/0121645 A1      Apr. 17, 2025

(30) Foreign Application Priority Data

Oct. 12, 2023    (DE) ......................... 102023127932.7

(51) Int. Cl.
B60G 21/05 (2006.01)

(52) U.S. Cl.
CPC ........ B60G 21/051 (2013.01); B60G 2200/21 (2013.01); B60G 2206/20 (2013.01)

(58) Field of Classification Search
CPC .............. B60G 21/051; B60G 2200/21; B60G 2206/20; B60G 2200/23; B60G 2206/8201
See application file for complete search history.

(56) References Cited

U.S. PATENT DOCUMENTS 7,284,765 B1 * 10/2007 Inoue ................... B60G 21/051
                                                      280/124.166
2007/0052194 A1 * 3/2007 Marchel ............... B60G 21/051
                                                      280/124.128
(Continued)

FOREIGN PATENT DOCUMENTS

DE          2735939 C2    10/1979
DE     102009037905 A1 *  2/2011   ........... B60G 21/051
(Continued)

OTHER PUBLICATIONS

Scheper et al. DE 10 2020 202319, Multipoint Link, Machine English Translation, ip.com (Year: 2020).*
(Continued)

*Primary Examiner* — Karen Beck
(74) *Attorney, Agent, or Firm* — HAUPTMAN HAM, LLP

(57) ABSTRACT

A twist beam axle has two side arms and a torsion profile. The torsion profile is connected to a side arm by a weld seam in each case. At least in the area of the welded connection, the torsion profile has a wall having a wall thickness that is greater than the wall thickness of a wall of a side arm. The torsion profile has a joining surface at each end section and the side arms each have a joining surface, wherein the torsion profile and the side arms are each connected at mutually facing joining surfaces by a weld seam. The joining surface at the end section of the torsion profile has a bevel. The joining gap formed between the mutually facing joining surfaces of the end section and the side arm is configured as V-shaped.

16 Claims, 4 Drawing Sheets

(56)     References Cited

U.S. PATENT DOCUMENTS

| | | | | |
|---|---|---|---|---|
| 2011/0227402 A1 * | 9/2011 | Wibbeke | .............. | B60G 21/051 |
| | | | | 301/124.1 |
| 2015/0360533 A1 * | 12/2015 | Seth | .................... | B60G 21/051 |
| | | | | 280/124.167 |

FOREIGN PATENT DOCUMENTS

| | | | | | |
|---|---|---|---|---|---|
| DE | 102020202319 A1 * | 8/2021 | ............. | B60G 7/001 |
| DE | 102023127934 B3 * | 4/2025 | ........... | B60G 21/051 |
| EP | 0916530 B1 | 12/2002 | | |
| WO | 2014/136261 A1 | 9/2014 | | |
| WO | 2021/170348 A1 | 9/2021 | | |

OTHER PUBLICATIONS

Extended European Search report in EP Application No. 24204235.
6, dated Mar. 20, 2025, 18pp.
Hans et al., Praxiswissen Schweissetechnik : Werkstoffe, Prozesse,
Fertigung, dated Jan. 1, 2013, Springer Vieweg. Springer Fachmedien
Wiesbaden GmbH, 2023, ProQuest Ebook Central, http://ebookcentral.
proquest.com/lib/epo-ebooks/detail. action?docID=1636692., Cre-
ated from epo-ebooks on Feb. 5, 2025 12:05:52, XP093246871,
Seiten 499-499, Abbildung 14.5, 2pp.
Wolfgang et al., Dubbel—Taschenbuch Fuer Den Maschinenbau,
dated Dec. 31, 1997, Springer Berlin / Heidelberg, ProQuest Ebook
Central, http://ebookcentral. proquest.com/lib/epo-ebooks/detail.
action?docID=6670432, Created from epo-ebooks, Feb. 5, 2025,
12:41:17, XP093246916, Tabelle 8, Fall 4 & 5, 2pp.
Office Action, German Application No. 10 2023 127 932.7, mailed
May 29, 2024, 7pp.

* cited by examiner

TWIST BEAM AXLE

RELATED APPLICATIONS

The present application claims priority of German Application Number 10 2023 127 932.7 filed Oct. 12, 2023, the disclosure of which is hereby incorporated by reference herein in its entirety.

FIELD

The present disclosure relates to a twist beam axle for motor vehicles.

BACKGROUND

A twist beam axle has two flexurally and torsionally rigid side arms and a torsion profile extending transversely between them, which connects the side arms in a torsion-flexible manner. A twist beam axle is characterized by good lateral guidance when cornering as well as its economical space requirement and low weight.

A twist beam axle with a V-shaped torsion profile in cross-section is described in DE 27 359 39 C2 or EP 0 916 530 B1. The torsion profile is welded to the side arms.

Due to the high dynamic and static forces acting during operation, for example, longitudinal forces, high loads are placed on the weld seam between the torsion profile and the side arms. The strength of the weld seams and the quality of the welds are important. The penetration depth of a weld seam is closely related to the joint strength.

Often, the torsion profile and the side arms have different wall thicknesses. The torsion profile has a greater wall thickness than the side arms. When welding by means of a butt joint due to the difference in wall thickness between the torsion profile and the side arm, obtaining a high penetration of the weld seam into the torsion profile without causing a burn-through on the side arm is difficult to achieve. The reduced penetration is able to lead to a reduction in the service life of a twist beam axle.

SUMMARY

The present disclosure improves the load behavior of a twist beam axle and increasing its service life without disadvantageously increasing its weight.

A twist beam axle has two side arms and a torsion profile that connects the two side arms in a torsion-flexible manner. The torsion profile is connected to each of the side arms by a welded joint. The torsion profile has a wall having a wall thickness and the side arms each have a wall having a wall thickness. The wall thickness of the wall of the torsion profile is, at least in the area of the welded joint, greater than the wall thickness of the wall of a side arm in the area of the welded joint. The torsion profile has a joining surface at each end section. Each side arm also has a joining surface. The torsion profile and the side arms are each connected by a weld seam at mutually facing joining surfaces.

The joining surface has a bevel at each end section of the torsion profile. Due to the bevel, the end section tapers in the direction of the front end of the torsion profile. The end sections of the torsion profile receive a seam preparation adapted to the welded joining. The joining surface is extended by the section of the bevel and tapers towards the end of the end section. Due to the bevel in the joining surface of the end section, the joining gap between the joining surface at the end section of the torsion profile and the joining surface at a side arm receives a V-shaped configuration. The joining gap between the end section of the torsion profile and the side arm is configured in a V-shape. The bevel and the V-shaped joining gap enable a high penetration in the torsion profile. The term penetration refers to the depth of the molten zone in the base material, here the steel material of the torsion profile in the end section.

The penetration is between 2% and 10%. Higher degrees of penetration are also able to be expected from the present disclosure. The flank penetration length, i.e., the length of the molten area in which the welding filler metal has bonded with the base material, is 70% to 90% of the wall thickness of the components, for example, the wall thickness of the torsion profile.

The present disclosure creates a twist beam axle having a longer service life without increasing the component weight. The advantageous driving dynamics properties and thus the performance with a maximum level of driving stability and comfort are retained.

The torsion profile and the side arms are aligned at an angle transverse to each other; for example, the torsion profile abuts each side arm with a T-joint.

An advantageous embodiment provides that the end section of the torsion profile has an abutment surface on the front side, wherein the abutment surface extends at a right angle to the longitudinal axis of the wall of the torsion profile. The frontal abutment surface is part of the joining surface at the end section of the torsion profile. The torsion profile abuts the joining surface on the side arm with its abutment surface.

The bevel runs out in the front side of the end section. The abutment surface is adjacent to the bevel.

The abutment surface is shorter than the length of the bevel. The abutment surface extends parallel to the joining surface on a side arm.

The bevel is machined. To produce the twist beam axle, a torsion profile is able to be provided which has its intended cross section, for example a U-shaped, V-shaped, or round cross section. The end sections are then machined and the bevel is created.

In at least one embodiment of the present disclosure, the bevel is provided in the areas of the abutment edge where the greatest loads due to external forces occur. In the torsion profile of the twist beam axle, the bevel is provided on the joining surfaces of the legs of the torsion profile. In the case of a torsion profile which is U-shaped or V-shaped in cross section, the bevel is arranged on the inside of the cross section on the inside of the torsion profile or on the outside of the cross section on the outside of the torsion profile along the legs. The bevel is provided on a partial section of the length of one leg of the torsion profile. According to the present disclosure, the bevel is provided in the lower longitudinal section of the length of the leg and extends over 30% to 75%, or approximately 50%, of the length of a leg. The tangential length of the bevel is measured in the cross section of the torsion profile in the direction of the circumference of the torsion profile and is able to extend over the entire circumferential length of the front side of the torsion profile. However, the tangential length of the bevel is also able to only extend over the length of one leg or be provided on a partial section of the length of a leg of a torsion profile.

In the areas or sections of the joining surface in which no bevel is provided, the joining surface of the torsion profile abuts the joining surface of a side arm.

The joining surface at the end section of the torsion profile is machined to produce the bevel. This removes material from the end section. This is able to be done, for example, by milling, turning, or grinding.

In at least one embodiment of the present disclosure, a wedge-shaped edge area is removed at the end of each end section of a torsion profile and the bevel is created in the joining surface.

The front sides of a sheet steel blank are able to first be machined and provided with a bevel, after which the blank is then formed into a torsion profile and provided with its intended cross section.

The bevel extends at an angle to the longitudinal axis of the wall of the torsion profile, the angle is in a range between 25° and 60°. In at least one embodiment of the present disclosure, an angle in the range of 30° to 45° is able to be achieved.

The bevel has an axial length, wherein the axial length is greater than the wall thickness of the wall of the torsion profile in the end section. In at least one embodiment of the present disclosure, the ratio of the axial length of the bevel to the wall thickness of the torsion profile wall is dimensioned between 1:1 and 2:1. The axial length of the bevel is measured in the direction of the longitudinal axis of the wall of the torsion profile.

The abutment surface on the front side of the end section of an end profile has a width, wherein the width is measured at a right angle to the longitudinal axis of the wall of the torsion profile. The width of the abutment surface is less than the wall thickness of the torsion profile wall, for example, the wall thickness of the torsion profile wall is 3 to 6 times the width of the abutment surface. Accordingly, the ratio of the width of the abutment surface to the wall thickness of the wall of the torsion profile in the end section is dimensioned between 1:3 and 1:6.

To produce the twist beam axle, two side arms and a torsion profile are provided. The components of the twist beam axle are made of steel. The torsion profile and the side arms have different wall thicknesses, at least in the area of the welded joint. This means the wall thickness of the torsion profile is thicker than the wall thickness of a side arm. The torsion profile and the side arms are arranged at an angle to one another and connected by a weld seam.

To produce the torsion profile, a starting blank is provided which has a wall having a wall thickness. A bevel is formed at the end section of the starting blank and a butt surface is created on the front side of the end section.

The starting blank is formed into the torsion profile. During this forming step, the starting blank is given a cross-sectional configuration of the torsional profile, at least in some areas, for example, over its length. In this case, the starting blank is formed around its longitudinal axis and provided with the cross section of the torsion profile, for example, profiled with a U-shaped or V-shaped cross section.

The two side arms are also provided. The side arms have a wall having a wall thickness which differs from the wall thickness of the wall of the torsion profile.

The torsion profile and the side arms are aligned at an angle relative to one another, so that the joining surface of the torsion profile and the joining surfaces of the side arms face toward one another. The torsion profile and side arms are then materially joined by a weld seam on the joining surfaces.

BRIEF DESCRIPTION OF THE DRAWINGS

The present disclosure is described in more detail hereinafter on the basis of drawings. In the figures.

DETAILED DESCRIPTION

Figure 1:
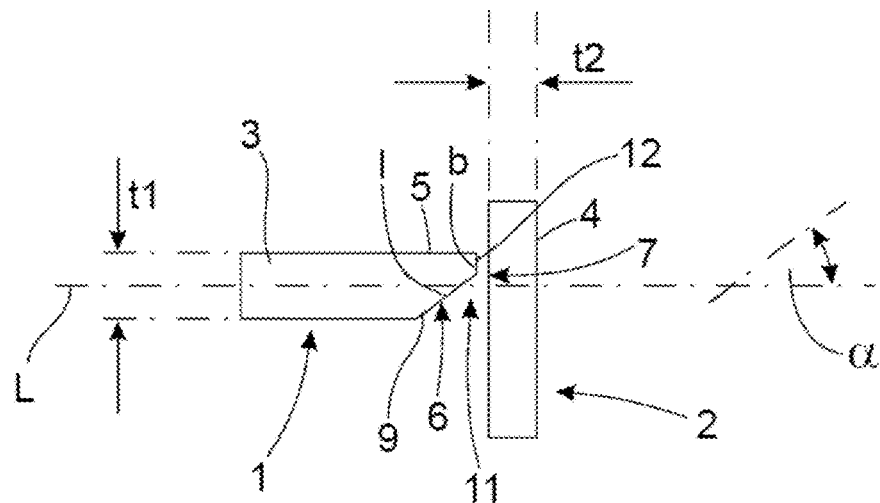
FIG. 1 shows, in technically schematic and simplified form, a detail of the wall of the torsion profile and a detail of the wall of a side arm before joining by welding according to at least one embodiment of the present disclosure.
Figure 2:
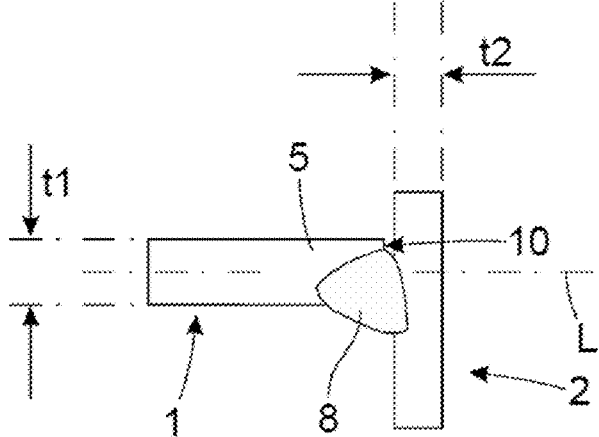
FIG. 2 shows the components according to the representation in FIG. 1 after joining by welding according to at least one embodiment of the present disclosure.
Figure 3:
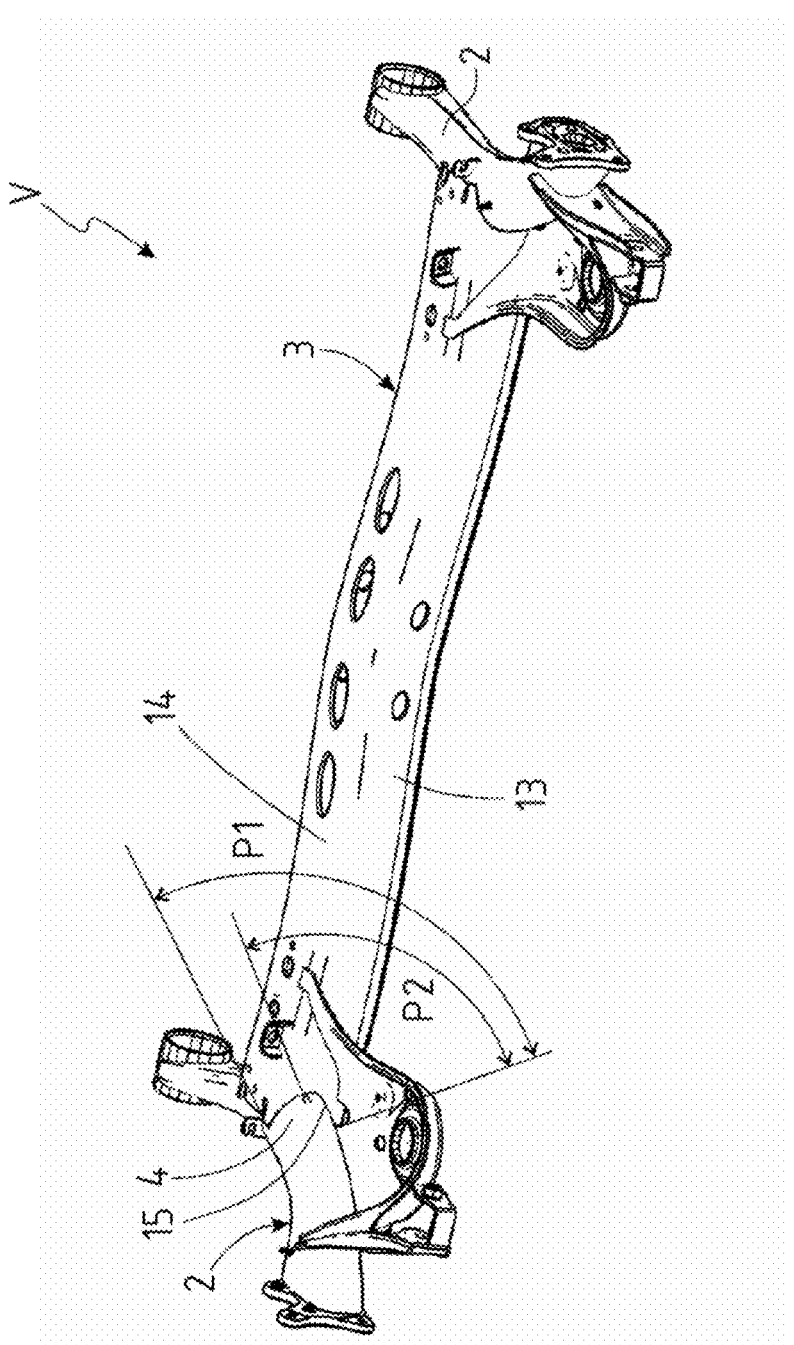
FIG. 3 shows a twist beam axle in a perspective view according to at least one embodiment of the present disclosure.

FIG. 1 and FIG. 2 show details of components of a twist beam axle for a motor vehicle. A twist beam axle V in perspective is shown in FIG. 3. A twist beam axle V includes two wheel-guiding side arms 2 and a torsion profile 1 connecting the two side arms 2. The torsion profile is designated by way of example with the reference numeral 1 and a side arm with the reference numeral 2.

The torsion profile 1 has a wall 3 having a wall thickness t1. The side arm or arms 2 each have a wall 4 having a wall thickness t2. The wall thickness t1 of the wall 3 of the torsion profile 1 is greater than the wall thickness t2 of the wall 4 of the side arm 2.

The torsion profile 1 has a joining surface 6 at each end section 5. The side arms 2 also each have a joining surface 7. The torsion profile 1 and the side arms 2 are each connected by a weld seam 8 at mutually facing joining surfaces 6, 7. The welded connection having the weld seam 8 is shown in FIG. 2.

The joining surface 6 at the end section 5 of the torsion profile 1 has a bevel 9. The bevel 9 is created by machining the end section 5. Due to the bevel 9, the end section 5 tapers in the direction of the front side 10 of the torsion profile 1.

To produce the welded connection, the torsion profile 1 and the side arm(s) 2 are positioned relative to one another. This is shown in FIG. 1. The joining surfaces 6, 7 face toward one another. A V-shaped joining gap 11 is formed between the joining surface 5 of the torsion profile 1 and the joining surface 6 of a side arm 2. The material connection is produced via a weld seam, as shown in FIG. 2. The bevel 9 makes the weld seam 8 more efficient, for example, a component-optimized penetration in the torsion profile 1 is able to be achieved.

The end section 5 of the torsion profile 1 has an abutment surface 12 on the front side. The abutment surface 12 extends substantially at right angles to the longitudinal axis L of the wall 3 of the torsion profile 1. The abutment surface 12 is oriented parallel to the joining surface 6 of a side arm 2. At the deepest point of the V-shaped joining gap 11, which adjoined by a parallel gap section formed between the abutting surface 12 and the joint surface 6.

Due to the bevel 9, the end section 5 tapers at an acute angle α towards the front side 10. The bevel 9 ends at the front side 10. The abutment surface 12 adjoins the bevel 9 at an obtuse angle.

The bevel 9 extends at an angle α to the longitudinal axis L of the wall 3 of the torsion profile 1. In the exemplary embodiment shown, the angle α is approximately 30°.

The bevel has an axial length 1. The axial length 1 is greater than the wall thickness t1 of the wall 3 of the torsion profile 1. The ratio of the axial length 1 of the bevel 9 to the wall thickness t1 of the wall 3 of the torsion profile 1 is able to be dimensioned between 1:1 and 2:1.

The abutment surface 12 has a smaller width b in comparison to the wall thickness t1 of the wall 3 of the torsion profile 1. The width b of the abutment surface 12 is measured at right angles to the longitudinal axis L of the wall 3 of the torsion profile 1. The ratio of the width b of the abutment surface 12 to the wall thickness t1 of the wall 3 of the torsion profile 1 is able to be dimensioned between 1:3 and 1:6. In at least one embodiment of the present disclosure, the width b of the abutment surface 12 is 1 mm to 3 mm, inclusive in each case.

The seam preparation and the formation of the bevel 9 in the joining surface 6 at the end section 5 of the torsion profile 1 as well as the V-shaped configuration of the joining gap 11 create a welded connection between the torsion profile 1 and the side arm 2 having a quality that meets the requirements. The penetration of the weld seam 8 on the torsion profile 1 is able to be increased without causing burn-through on the side arm 2. The weld seam 8 meets the highest strength requirements, with the result that the service life of the twist beam axle is able to be increased without a disadvantageous increase in weight.

FIG. 3 shows a twist beam axle V. The torsion profile 1 abuts each side arm 2 with a T-joint. The torsion profile 1 has a wall 3 (see FIG. 1 and FIG. 2 in this regard) and has a U-shaped cross-sectional profile having two side legs 13, which are connected via a vertex section 14. With the end section 5, the torsion profile 1 abuts the wall 4 of a side arm 2. The joining surface 6 at the end section 5 of the torsion profile 1 is adapted to the outer contour of the side arm 2 and extends curved in an arc shape.

The arrow P1 schematically indicates the tangential length of a side leg 13 with which the end section 5 of the torsion profile 1 abuts the outer circumference of the side arm 2. This is approximately 180°+/−15°, relative to the circumference of the side arm 2, which is round in cross section.

The arrow P2 indicates the length of the longitudinal section 15 in which the bevel 9 is provided on the inner side of a leg 13 of the torsion profile 1. The bevel 9 is provided in the lower longitudinal section 15 of the side leg 13. The bevel 9 extends over 30% to 75%, or approximately half the length of a side leg 13. In relation to the cross section of a side arm 2, the bevel 9 extends over a circumferential section of approximately 90°+/−15°. The bevel 9 is provided in the lower longitudinal section 15 of a side leg 13, starting from the free leg end.

Figure 4:
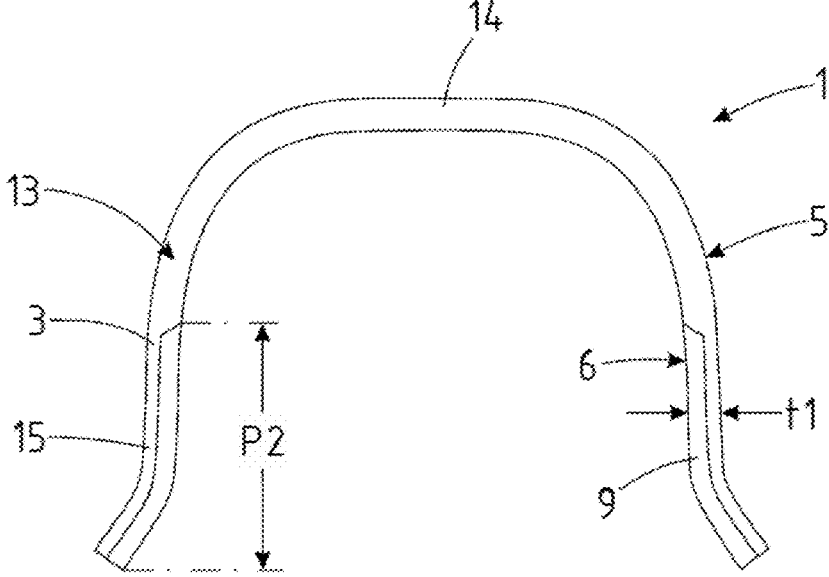
FIG. 4 shows a view of the front side of the end section of a torsion profile according to at least one embodiment of the present disclosure.

FIG. 4 shows a front view of the joining surface 6 at an end section 5 of a torsion profile 1. The torsion profile 1 has a wall 3 having a wall thickness t1. A bevel 9 is provided in the joining surface 6 at the end section 5 of the torsion profile 1. The bevel 9 extends on the inside of the side legs 13 of the torsion profile 1.

The bevel 9 is provided in the lower longitudinal section 15 of the side leg 13, starting from the free leg end. The tangential length of the length section 15 is indicated by the arrow P2. In at least one embodiment of the present disclosure, the bevel 9 extends approximately over half the length of a side leg 13.

Figure 5:
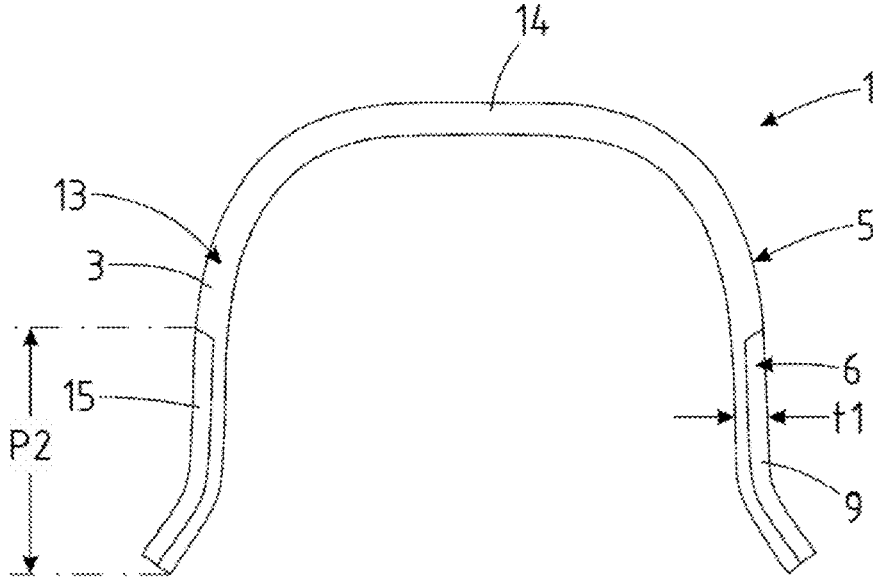
FIG. 5 shows a view of the front side of the end section of a further embodiment of a torsion profile according to at least one embodiment of the present disclosure.

FIG. 5 shows a front view of the joining surface 6 in an alternative embodiment at the end section 5 of a torsion profile 1. Unlike the embodiment according to FIG. 4, here the bevel 9 is arranged on the outside of the side legs 13 of the torsion profile. As with the other embodiments, the bevel 9 is created by machining. The bevel 9 extends in a lower longitudinal section 15 of each side leg 13, starting from the free leg end. Otherwise, the embodiment corresponds to that of FIG. 4 and the associated description.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A twist beam axle, comprising:
   two side arms connected to each other by a torsion profile, wherein the torsion profile has a wall having a wall thickness and the two side arms each have a wall having a wall thickness, wherein the wall thickness of the wall of the torsion profile is greater than the wall thickness of the wall of a side arm of the two side arms, and the torsion profile has a joining surface at each end section thereof, and the two side arms each have a joining surface, wherein the torsion profile and the two side arms are each connected at the joining surfaces by a weld seam, and the torsion profile has two side legs connected via a vertex section and the joining surface has a bevel at the end section of the torsion profile, wherein the bevel is in a lower longitudinal section of a side leg and extends over 30% and no more than 75% of a length of the side leg, and the bevel and the joining surface of the side arm form a V-shaped joining gap.

2. The twist beam axle according to claim 1, wherein the end section of the torsion profile has an abutment surface on a front side thereof, wherein the abutment surface extends substantially at right angles to a longitudinal axis of the wall of the torsion profile.

3. The twist beam axle according to claim 2, wherein the abutment surface adjoins the bevel.

4. The twist beam axle according to claim 1, wherein the bevel is a machined bevel.

5. The twist beam axle according to claim 1, wherein the bevel extends at an angle of 25° to 60°, to the longitudinal axis of the wall of the torsion profile.

6. The twist beam axle according to claim 1, wherein the bevel has an axial length and a ratio of the axial length of the bevel to the wall thickness of the wall of the torsion profile is dimensioned between 1:1 and 2:1.

7. The twist beam axle according to claim 2, wherein the abutment surface has a width measured at right angles to the longitudinal axis of the wall of the torsion profile, and a ratio of the width of the abutment surface to the wall thickness of the wall of the torsion profile is dimensioned between 1:3 and 1:6.

8. The twist beam axle according to claim 1, wherein the bevel is in a longitudinal section starting from a free leg end of the side leg of the torsion profile.

9. The twist beam axle according to claim 1, wherein the bevel extends at an angle of 30° to 45°, to the longitudinal axis of the wall of the torsion profile.

10. The twist beam axle according to claim 2, wherein the abutment surface of the torsion profile and the joining surface of the side arm form a parallel gap section at a deepest point of the V-shaped joining gap.

11. The twist beam axle according to claim 1, wherein the bevel is arranged on an inner side of the side leg of the torsion profile.

12. The twist beam axle according to claim 1, wherein the bevel is arranged on an outer side of the side leg of the torsion profile.

13. The twist beam axle according to claim 1, wherein the V-shaped joining gap forms a space between the torsion profile and the side arm such that the torsion profile and the side arm do not contact each other directly.

14. The twist beam axle according to claim 10, wherein the bevel is arranged on an inner side of the side leg of the torsion profile.

15. The twist beam axle according to claim 14, wherein the bevel is arranged on an outer side of the side leg of the torsion profile.

16. The twist beam axle according to claim 15, wherein the V-shaped joining gap forms a space between the torsion profile and the side arm such that the torsion profile and the side arm do not contact each other directly.

\* \* \* \* \*